(12) United States Patent
Zhang

(10) Patent No.: US 10,973,369 B2
(45) Date of Patent: Apr. 13, 2021

(54) AIR FRYER WITH FLIP FUNCTION

(71) Applicant: NINGBO CARELINE ELECTRIC APPLIANCE CO., LTD., NingBo (CN)

(72) Inventor: Yi Chi Zhang, NingBo (CN)

(73) Assignee: NINGBO CARELINE ELECTRIC APPLIANCE CO., LTD., NingBo (CN)

( * ) Notice: Subject to any disclaimer, the term of this patent is extended or adjusted under 35 U.S.C. 154(b) by 235 days.

(21) Appl. No.: 16/009,240

(22) Filed: Jun. 15, 2018

(65) Prior Publication Data

US 2019/0208958 A1 Jul. 11, 2019

Related U.S. Application Data

(63) Continuation of application No. PCT/CN2018/074133, filed on Jan. 25, 2018.

(30) Foreign Application Priority Data

Jan. 11, 2018 (CN) .......................... 201810027901.8

(51) Int. Cl.
*A47J 37/01* (2006.01)
*A47J 37/04* (2006.01)
(Continued)

(52) U.S. Cl.
CPC ......... *A47J 37/0641* (2013.01); *A47J 27/004* (2013.01); *A47J 37/041* (2013.01);
(Continued)

(58) Field of Classification Search
CPC ....... A47J 37/0641; A47J 39/003; A23L 5/17; A23L 5/10
See application file for complete search history.

(56) References Cited

U.S. PATENT DOCUMENTS 2,983,218 A * 5/1961 Persinger ............... A47J 37/049
  99/427
3,861,290 A * 1/1975 Ringo ................... A47J 37/042
  99/427

(Continued)

FOREIGN PATENT DOCUMENTS

CN 203654023 U * 6/2014
CN 205072703 U * 3/2016 .......... A47J 37/0641
WO WO-2017001221 A1 * 1/2017 .......... A47J 37/0754

*Primary Examiner* — Robert J Utama
*Assistant Examiner* — Lawrence H Samuels
(74) *Attorney, Agent, or Firm* — JCIPRNET

(57) ABSTRACT

An air fryer with a flip function includes a body and an internal cavity installed in a lower interior of the body. A first wind wheel is mounted on an inner side at an upper end of the internal cavity. A heating pipe is installed below the first wind wheel. A partition is arranged above the internal cavity within the body. A cold circulation channel is formed between the internal cavity, the partition and the body. A second wind wheel is mounted on an upper end of the cold circulation channel. A detachable flip rack is horizontally provided in a middle portion of the internal cavity. A drive motor is arranged on an outer side of the internal cavity to drive one end of the detachable flip rack to rotate. An opening is provided on one side of the inner cavity. A flip openable panel is provided at the opening.

7 Claims, 7 Drawing Sheets

(51) Int. Cl.
*A47J 37/06* (2006.01)
*A47J 27/00* (2006.01)
*A47J 43/18* (2006.01)

(52) U.S. Cl.
CPC ......... *A47J 37/047* (2013.01); *A47J 37/0664* (2013.01); *A47J 37/0694* (2013.01); *A47J 43/18* (2013.01)

(56) References Cited

U.S. PATENT DOCUMENTS

| | | | | |
|---|---|---|---|---|
| 3,867,877 | A * | 2/1975 | Zajc | A47J 37/049 99/402 |
| 4,409,452 | A * | 10/1983 | Oouchi | A47J 37/041 126/338 |
| 4,810,856 | A * | 3/1989 | Jovanovic | A47J 37/041 219/401 |
| 5,205,208 | A * | 4/1993 | Gongwer | A21B 3/155 198/704 |
| 5,497,697 | A * | 3/1996 | Promny | A47J 37/047 99/394 |
| 5,970,854 | A * | 10/1999 | Tsai | A47J 37/042 99/419 |
| 6,173,645 | B1 * | 1/2001 | Backus | A47J 37/041 220/326 |
| 6,568,316 | B1 * | 5/2003 | Backus | A47J 37/041 99/419 |
| 7,060,942 | B2 * | 6/2006 | Friedl | A47J 37/042 126/21 A |
| D740,069 | S * | 10/2015 | Nichols | D7/409 |
| 2010/0326288 | A1 * | 12/2010 | Tiszai | A47J 37/1223 99/355 |
| 2012/0024169 | A1 * | 2/2012 | Hsu | A47J 37/042 99/450 |
| 2014/0026698 | A1 * | 1/2014 | Hsu | A47J 37/041 74/352 |
| 2014/0026701 | A1 * | 1/2014 | Hsu | A47J 37/041 74/421 R |
| 2014/0345593 | A1 * | 11/2014 | Hsu | A47J 37/041 126/25 AA |
| 2017/0245683 | A1 * | 8/2017 | Chen | A47J 37/0641 |
| 2018/0177334 | A1 * | 6/2018 | Bonaccorso | A47J 37/0754 |
| 2019/0110640 | A1 * | 4/2019 | Te Velde | A47J 37/0641 |
| 2019/0246835 | A1 * | 8/2019 | Tsai | A47J 37/0641 |

* cited by examiner

AIR FRYER WITH FLIP FUNCTION

CROSS-REFERENCE TO RELATED APPLICATION

This is a continuation of International Application No. PCT/CN2018/074133, filed on Jan. 25, 2018, which claims the priority benefits of China Application No. 201810027901.8, filed on Jan. 11, 2018. The entirety of each of the above-mentioned patent applications is hereby incorporated by reference herein and made a part of this specification.

BACKGROUND OF THE INVENTION

1. Field of the Invention

The present invention relates to the field of air fryers, in particular to an air fryer with a flip function.

2. Description of Related Art

In the existing air fryer, the container for containing food is of a drawer-type structure. In the process of heating the food, the body of the fryer is stationary, and when the food is placed in the fryer and baked therein, no effect of flipping or rolling will be provided, and the efficiency of food baking is limited.

SUMMARY OF THE INVENTION

The present invention provides an air fryer with a flip function, which can flip the food when heated and is conducive to the uniform heating of the food, improves the efficiency of food baking, and facilitates placing-in and taking-out operations of the food.

In an embodiment of the invention, an air fryer with a flip function comprising a body and an internal cavity installed in a lower interior of the body, a first wind wheel being mounted on an inner side at an upper end of the internal cavity, a heating pipe being installed below the first wind wheel, a partition being arranged above the internal cavity within the body, a cold circulation channel being formed between the internal cavity, the partition and the body, a second wind wheel being mounted on an upper end of the cold circulation channel, an opening being provided on one side of the internal cavity, a detachable flip rack being provided in a middle portion of the internal cavity, rotating shafts being axially mounted at both ends of the detachable flip rack, a drive motor being mounted on one side of the partition above an outer side of the internal cavity to drive the detachable flip rack to rotate via the rotating shafts at one end, an erection seat being disposed on a sidewall of the internal cavity to erect the rotating shafts at the other end of the detachable flip rack, the erection seat having a bevel face at its front upper end, a U-shaped groove being arranged in a top portion of the bevel face and one end of the rotating shafts being embedded in the U-shaped groove is provided.

According to an embodiment of the invention, the drive motor is mounted on one side of the partition above a transmission wheel and a rotating shaft of the drive motor is connected with the transmission wheel via an input transmission wheel and a transmission belt, the rotating shafts at one end of the detachable flip rack is plugged in a connection seat on a sidewall of the internal cavity, and the connection seat is connected with the transmission wheel.

According to an embodiment of the invention, a positive octagonal socket is provided in one end face of the connection seat, one end of the rotating shafts is a square plug column, and the square plug column is axially plugged into the positive octagonal socket and rotates with the connection seat.

According to an embodiment of the invention, the detachable flip rack is a square shaft flip rack with a U-shaped fork structure symmetrically mounted at both ends thereof.

According to an embodiment of the invention, the detachable flip rack is a mesh drum, the rotating shafts are respectively installed in middle portions at both ends of the meshed drum, the rotating shafts at one end is connected with the connection seat, and the rotating shafts at the other end is embedded in the U-shaped groove.

According to an embodiment of the invention, discs are axially symmetrically arranged at both ends of the detachable flip rack, slot notches are evenly arranged at a circumferential edge of each of the discs, sockets are opened in a central portion of the discs between the adjacent slot notches, a skewer rod is axially arranged between the two discs and around circumferences thereof, the skewer rod has a hook-shaped part at one end thereof which is stuck within one of the slot notches and has a pointed head at the other end thereof which is inserted into a corresponding socket.

According to an embodiment of the invention, the detachable flip rack is a flat basket, a basket lid is detachably arranged at an upper end of the flat basket, buckle parts are arranged to protrude from edges of the basket lid to engage with upper edges of the flat basket, a handle is arranged in a middle portion at an upper end of the basket lid, rotating shafts are respectively installed in middle portions at both ends of the flat basket, the rotating shafts at one end is connected with the connection seat, and the rotating shafts at the other end is embedded in the U-shaped groove.

According to an embodiment of the invention, an opening is provided on one side of the inner cavity, a flip openable panel is provided at the opening, rotating shafts are symmetrically arranged at both ends of a lower side of the panel, and caulking grooves are arranged on an inner sidewall on a lower side of the corresponding opening of the body.

According to an embodiment of the invention, a transparent window is arranged in a middle portion of the panel.

Based on the above, the present invention relates to an air fryer with a flip function, wherein a cold circulation channel is arranged on the outer side of the internal cavity to facilitate transfer of heat out of the sidewall of the internal cavity through the sidewall of the body, thereby obtaining a good heat dissipation effect; a detachable flip rack which can be electrically driven to rotate is set in the internal cavity of a lower core, such that food, when placed on the food rack for baking, can be flipped along with the rotation of a main shaft, thereby being conducive to the uniform heating of the food, improving the efficiency of food baking, and further drying the moisture of the food; a detachable flip rack of multiple structures is employed to provide a possibility for structural implementations of the flip-type air fryer, replacement can be made depending on different kinds of food, and at the same time, it facilitates placing-in and taking-out operations of the food; the drive motor is installed on one side of the partition above, which will not increase the volume of the air fryer in structure, but can save working procures in the subsequent assembly, thereby facilitating manufacturing and installation; and the air fryer has a side opening, and the bevel face at the front upper end of the erection seat can play a guiding role to facilitate the installation of the rotating shafts.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
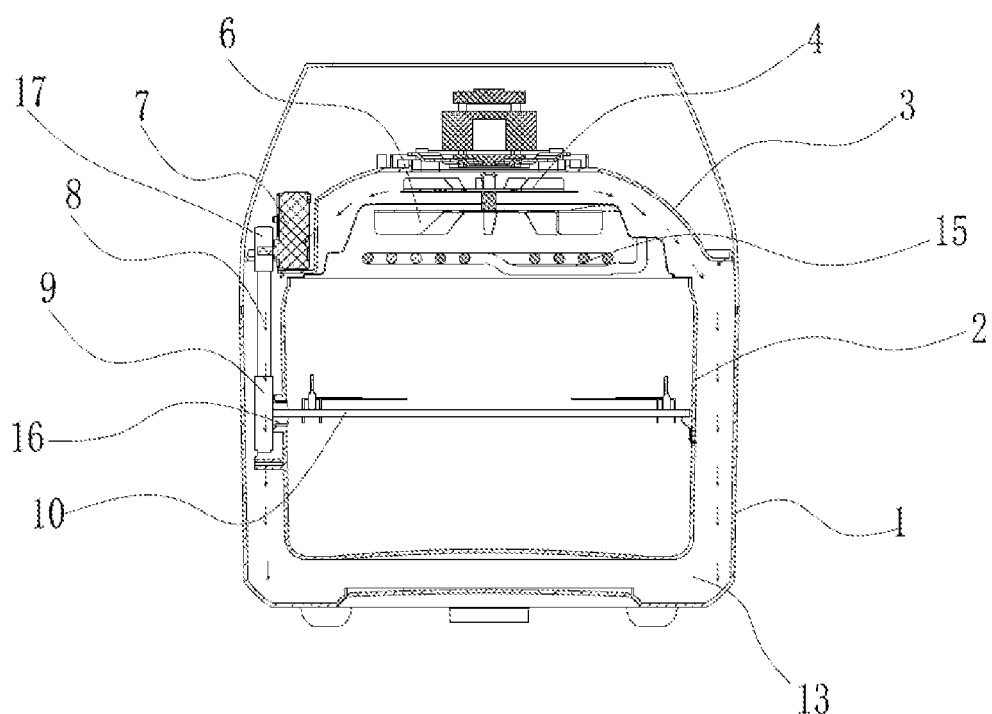
FIG. 1 is a front semi-sectional structural view of a first structure of the detachable flip rack in an installation state as recited in the present invention.

Reference will now be made in detail to the present preferred embodiments of the invention, examples of which are illustrated in the accompanying drawings. Wherever possible, the same reference numbers are used in the drawings and the description to refer to the same or like parts.

The present invention is further described below in combination with specific examples. It should be understood that these examples are only for illustrating the present invention and are not intended to limit the scope of the present invention. In addition, it should be understood that after reading the teachings of the present invention, those skilled in the art can make various changes or modifications to the present invention, and these equivalent forms also fall within the scope defined by the appended claims of the present application.

Figure 2:
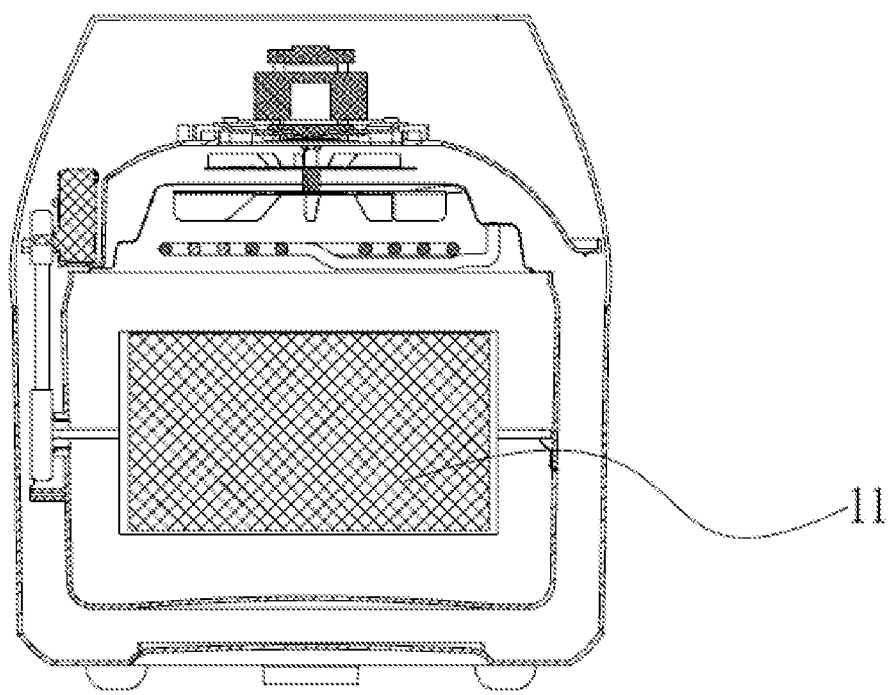
FIG. 2 is a front semi-sectional structural view of a second structure of the flip rack in an installation state as recited in the present invention.
Figure 3:
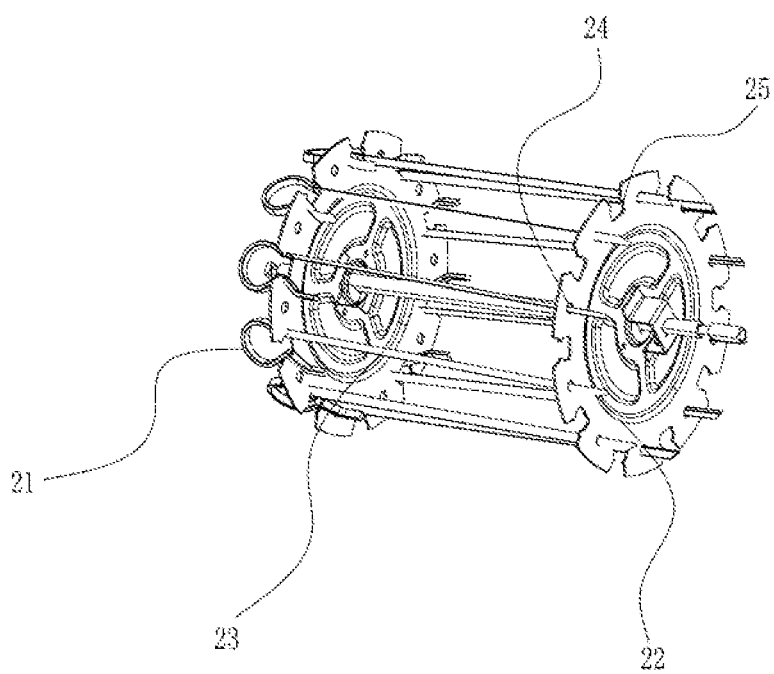
FIG. 3 is a perspective structural view of a third structure of the detachable flip rack as recited in the present invention.
Figure 4:
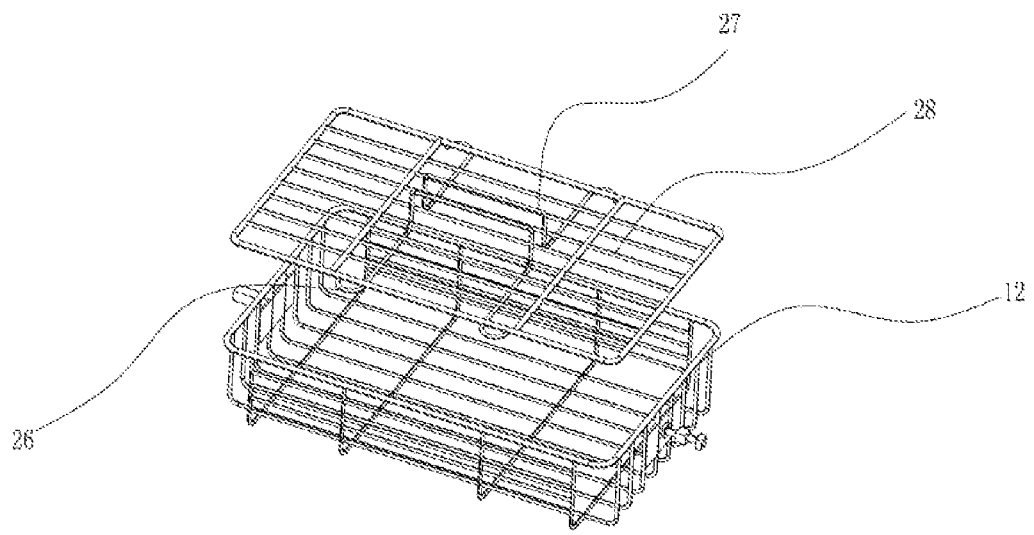
FIG. 4 is a perspective structural view of a fourth structure of the detachable flip rack as recited in the present invention.
Figure 5:
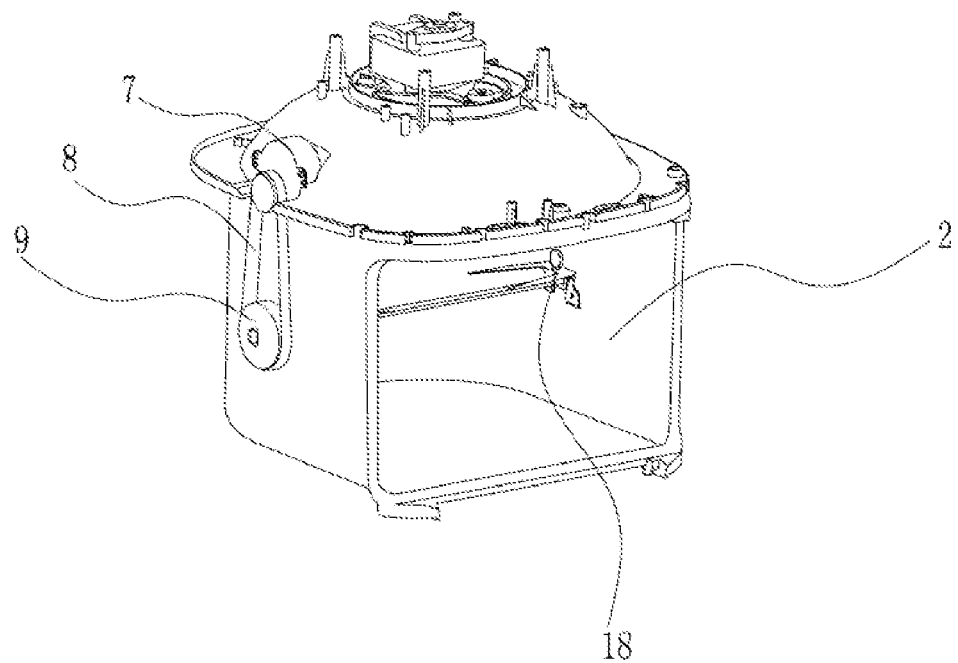
FIG. 5 is a perspective structural view of an internal structure of the present invention.
Figure 6:
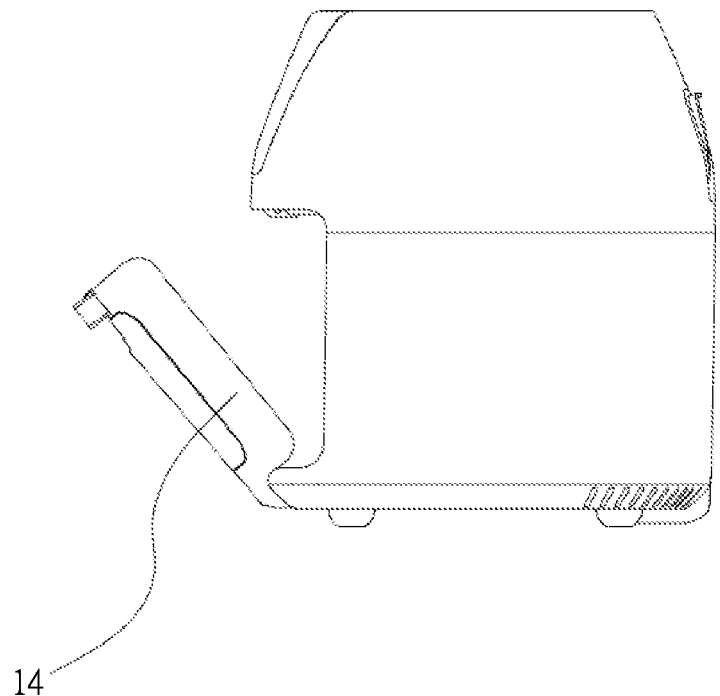
FIG. 6 is a side structural view of the present invention.
Figure 7:
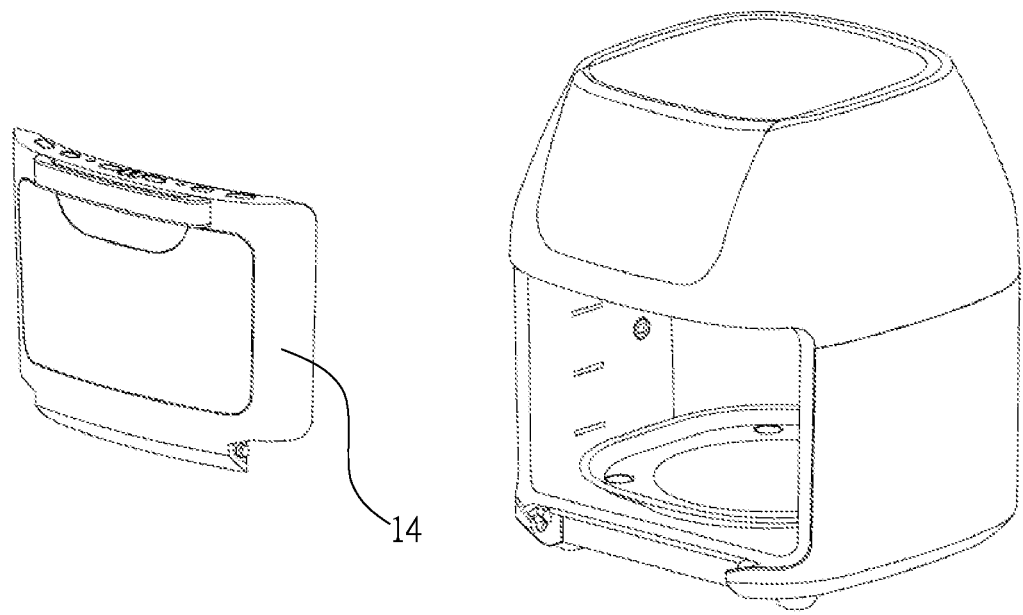
FIG. 7 is a perspective structural view of the panel of the present invention in a disassembled state.
Figure 8:
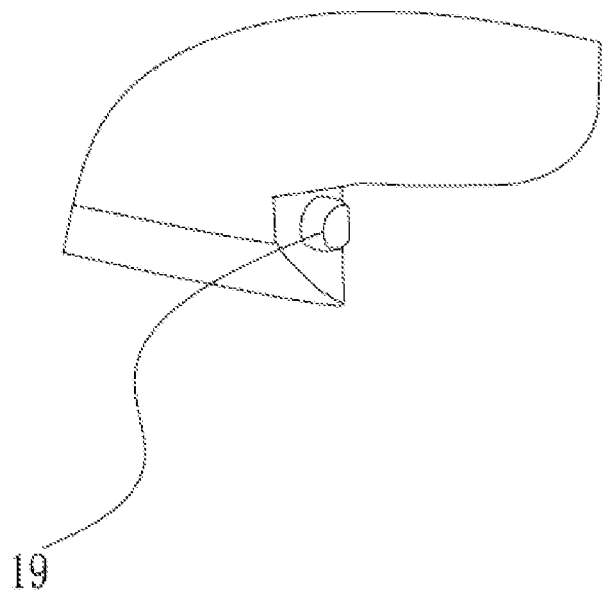
FIG. 8 is a partial structural view of the present invention.
Figure 9:
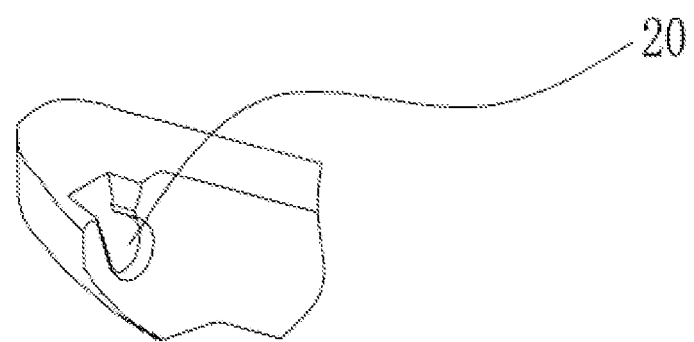
FIG. 9 is a partial structural view of the present invention.
Figure 10:
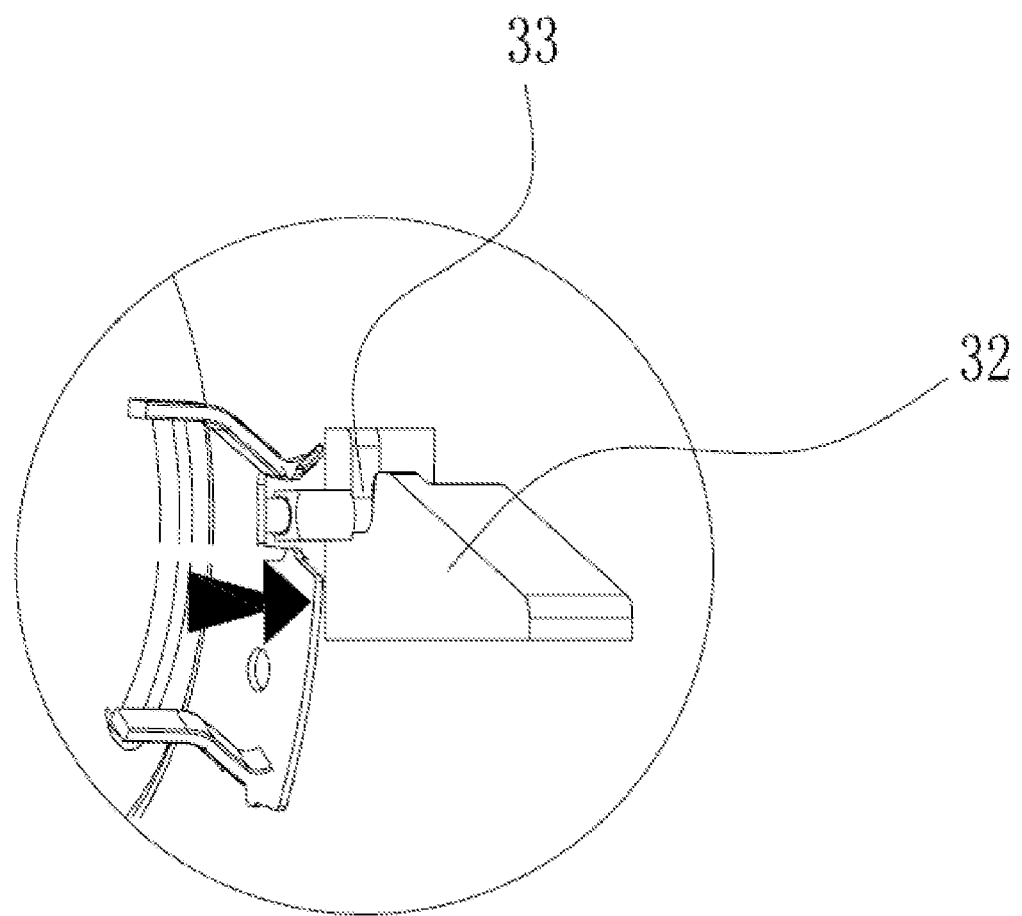
FIG. 10 is a perspective structural view of the erection seat as recited in the present invention.
Figure 11:
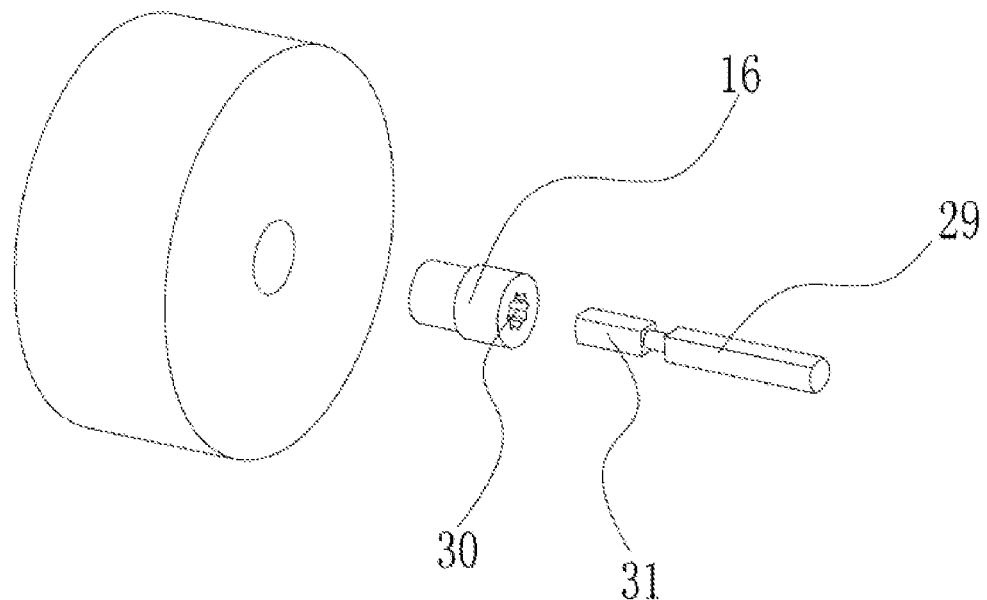
FIG. 11 is a perspective view of a plug connection structure of the rotating shafts and the connection seat as recited in the present invention.

As shown in FIGS. 1-11, an embodiment of the present invention relates to an air fryer with a flip function, comprising a body 1 and an internal cavity 2 installed in a lower interior of the body 1, a first wind wheel 6 being mounted on an inner side at an upper end of the internal cavity 2, a heating pipe 15 being installed below the first wind wheel 6, a partition 3 being arranged above the internal cavity 2 within the body 1, a cold circulation channel 13 being formed between the internal cavity 2, the partition 3 and the body 1, a second wind wheel 4 being mounted on an upper end of the cold circulation channel 13, an opening being provided on one side of the internal cavity 2, a detachable flip rack 10 being horizontally provided in a middle portion of the internal cavity 2, and a drive motor 7 being mounted on an outer side of the internal cavity 2 to drive one end of the detachable flip rack 10 to rotate.

As an example of the present invention, in use, the food is fixed on the detachable flip rack 10, and the detachable flip rack 10 can be driven by the drive motor 7 to rotate at a constant speed. At the same time, the first wind wheel 6 will work to blow wind which, after being heated by the heating pipe 15, will form a circulation in the internal cavity 2 to bake the food on the detachable flip rack 10. At the same time, the second wind wheel 4 above the cold circulation channel 13 rotates to conduct a wind circulation in the cold circulation channel 13 to take the resulting heat away from the sidewall of the internal cavity 2 and discharge it out of the sidewall of the body 1.

As a specific mounting and driving mode of the detachable flip rack 10 of the present invention, the drive motor 7 is mounted on one side of the partition 3 above the transmission wheel 9 and a rotating shaft of the drive motor 7 is connected with the transmission wheel 9 via an input transmission wheel 17 and a transmission belt 8, the rotating shaft 29 at one end of the detachable flip rack 10 is connected with a connection seat 16 on a sidewall of the internal cavity 2, the connection seat 16 is connected with the transmission wheel 9, the connection seat 16 can be disassembled to facilitate removal of the detachable flip rack 10 for cleaning and replacement and fixing of the food, the drive motor 7 is arranged closely to the partition 3 and its power is transmitted to the transmission wheel 9 via the input transmission wheel 17 and the transmission belt 8 to facilitate control over rotation of the detachable flip rack 10 at a constant speed, the installation of the drive motor 7 on one side of the partition 3 in the present invention will not increase the volume of the air fryer in structure, and when the partition 3 is made, a motor seat corresponding to the drive motor 7 can be formed, which can save a lot of working procedures in the subsequent assembly, thus facilitating the manufacturing and installation.

As a plug connection mode between the connection seat 16 and the rotating shaft 29, a positive octagonal socket 30 is provided in one end face of the connection seat 16, one end of the rotating shaft 29 is a square plug column 31, the square plug column 31 is axially plugged into the positive octagonal socket 30 and rotates with the connection seat 16, and the positive octagonal socket 30 allows the square plug column 31 to be plugged therein at various angles.

The rotating shaft 29 at the other end of the detachable flip rack 10 is erected on the erection seat 32 on the sidewall of the internal cavity 2, the erection seat 32 has a bevel face at its front upper end, a U-shaped groove 33 is arranged in a top portion of the bevel face, and one end of the rotating shaft 29 is embedded in the U-shaped groove 33 to facilitate the erection of the rotating shafts 29; the air fryer has a side opening, so when the rotating shaft 29 is to be installed, it can be tilted with one end thereof connected with the drive motor 7 and the other end thereof placed on the bevel face at the front upper end of the erection seat 32, and then the rotating shaft 29 is pushed along the tilted surface so as to be embedded in the U-shaped groove 33. The bevel face can play a guiding role to facilitate the installation of the rotating shafts 29.

As a specific implementation structure of the detachable flip rack 10, a U-shaped fork structure 18 is symmetrically mounted at both ends of the detachable flip rack 10, the U-shaped fork structure 18 can be inserted into the food and fix it, and this structure facilitates fixing of roast chicken, roast duck, and other relatively large food materials.

As a second specific implementation structure of the detachable flip rack 10, the middle portion of the detachable flip rack 10 is a mesh drum 11; a large number of relatively small food materials, such as nuts, are conveniently placed within the mesh drum 11, and the food materials can roll in the mesh drum 11 and thus be evenly heated and baked; the detachable flip rack 10 is a mesh drum 11, the rotating shafts 29 are respectively installed in middle portions at both ends of the meshed drum 11, the rotating shaft 29 at one end is connected with the connection seat 16, and the rotating shaft 29 at the other end is embedded in the U-shaped groove 33.

As a third specific implementation structure of the detachable flip rack 10, discs 22 are axially symmetrically arranged at both ends of the detachable flip rack 10, slot notches 25 are evenly arranged at a circumferential edge of each of the discs 22, sockets 24 are opened in a central portion of the discs 22 between the adjacent slot notches 25, a skewer rod 23 is axially arranged between the two discs 22 and around circumferences thereof, the skewer rod 23 has a hook-shaped part 21 at one end thereof which is stuck within one of the slot notches 25 and has a pointed head at the other end thereof which is inserted into a corresponding socket 24; in use, the skewer rod 23 can be removed from the discs 22 by pressing the hook-shaped part 21, inserted into such food as roast meat and rice cakes, and then fixed to the discs 22, in which way, the discs 22 and all the skewer rods 23 can be rotated together with the detachable flip rack 10 to bake the food.

As a fourth specific implementation structure of the detachable flip rack 10, the middle portion of the detachable flip rack 10 is a flat basket 12, a basket lid 28 is detachably arranged at an upper end of the flat basket 12, buckle parts 26 are arranged to protrude from edges of the basket lid 28 to engage with upper edges of the flat basket 12, a handle 27 is arranged in a middle portion at an upper end of the basket lid 28, rotating shafts 29 are respectively installed in middle portions at both ends of the flat basket 12, the rotating shaft 29 at one end is connected with the connection seat 16, and the rotating shaft 29 at the other end is embedded in the U-shaped groove 33; the flat basket 12 can be used for placing some relatively flat food or a large amount of relatively large food, such as steak, spare ribs, and large eggplants; a buckle connection between the buckle parts 26 and the flat basket 12 after putting the food into the flat basket 12 can prevent the food from falling, and the entire flat basket 12 can be rotated along with the detachable flip rack 10 to bake the food.

Alternatively, an opening is provided on one side of the inner cavity 2, a flip openable panel 14 is provided at the opening, rotating shafts 19 are symmetrically arranged at both ends of a lower side of the panel 14, and caulking grooves 20 are arranged on an inner sidewall on a lower side of the corresponding opening of the body 1 to facilitate disassembly and installation of the panel 14 as well as the cleaning of the panel 14.

A transparent window is arranged in a middle portion of the panel 14 to facilitate the observation of the internal food.

In summary, the cold circulation channel is arranged on the outer side of the internal cavity in the present invention to facilitate transfer of heat out of the sidewall of the internal cavity through the sidewall of the body, thereby obtaining a good heat dissipation effect; the detachable flip rack which can be electrically driven to rotate is set in the internal cavity of the lower core, such that food, when placed on the food rack for baking, can be flipped along with the rotation of the main shaft, thereby being conducive to the uniform heating of the food, improving the efficiency of food baking, and further drying the moisture of the food; the detachable flip rack of multiple structures is employed to provide a possibility for structural implementations of the flip-type air fryer, replacement can be made depending on different kinds of food, and at the same time, it facilitates placing-in and taking-out operations of the food.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An air fryer with a flip function, comprising: a body and an internal cavity installed in a lower interior of the body, a first wind wheel being mounted on an inner side at an upper end of the internal cavity, a heating pipe being installed below the first wind wheel, a partition being arranged above the internal cavity within the body, a cold circulation channel being formed between the internal cavity, the partition and the body, a second wind wheel being mounted on an upper end of the cold circulation channel, an opening being provided on one side of the internal cavity, a detachable flip rack being provided in a middle portion of the internal cavity, rotating shafts being axially mounted at both ends of the detachable flip rack, a drive motor being mounted on one side of the partition above an outer side of the internal cavity to drive the detachable flip rack to rotate via the rotating shafts at one end, a mounting seat being disposed on a sidewall of the internal cavity to mount the rotating shafts at the other end of the detachable flip rack, the mounting seat having a bevel face at its front upper end, a U-shaped groove being arranged in a top portion of the bevel face and one end of the rotating shafts being embedded in the U-shaped groove, wherein discs are axially symmetrically arranged at both ends of the detachable flip rack, slot notches are evenly arranged at a circumferential edge of each of the discs, sockets are opened in a central portion of an area of the discs between the adjacent slot notches, skewer rods are configured to extend axially between the two discs and around circumferences thereof, each of the skewer rods has a hook-shaped part at one end thereof which is stuck within one of the slot notches and has a pointed head at the other end thereof which is inserted into a corresponding socket.

2. The air fryer with the flip function according to claim 1, wherein the drive motor is mounted on one side of the partition above a transmission wheel and a rotating shaft of the drive motor is connected with the transmission wheel via an input transmission wheel and a transmission belt, the rotating shafts at one end of the detachable flip rack is connected with a connection seat on a sidewall of the internal cavity, and the connection seat is connected with the transmission wheel.

3. The air fryer with the flip function according to claim 2, wherein a positive octagonal socket is provided in one end face of the connection seat, one end of the rotating shafts is a square plug column, and the square plug column is axially plugged into the positive octagonal socket and rotates with the connection seat.

4. The air fryer with the flip function according to claim 2, wherein an on one side of the inner cavity, a flip openable panel is provided at the opening, rotating shafts are symmetrically arranged at both ends of a lower side of the panel, and caulking grooves are arranged on an inner sidewall on a lower side of a corresponding opening of the body.

5. The air fryer with the flip function according to claim 4, wherein a transparent window is arranged in a middle portion of the panel.

6. The air fryer with the flip function according to claim 1, wherein an opening is provided on one side of the inner cavity, a flip openable panel is provided at the opening, rotating shafts are symmetrically arranged at both ends of a lower side of the panel, and caulking grooves are arranged on an inner sidewall on a lower side of a corresponding opening of the body.

7. The air flyer with the flip function according to claim 6, wherein a transparent window is arranged in a middle portion of the panel.

* * * * *